US008726116B2

(12) United States Patent
Hwang et al.

(10) Patent No.: US 8,726,116 B2
(45) Date of Patent: May 13, 2014

(54) PHYSICAL UPLINK SHARED CHANNEL ENCODER FOR USER EQUIPMENT MODEM AND ENCODING METHOD OF THE SAME

(75) Inventors: Soo Yun Hwang, Daejeon (KR); Daeho Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 559 days.

(21) Appl. No.: 12/973,354

(22) Filed: Dec. 20, 2010

(65) Prior Publication Data
US 2012/0030534 A1   Feb. 2, 2012

(30) Foreign Application Priority Data
Jul. 29, 2010  (KR) ........................ 10-2010-0073378

(51) Int. Cl.
*G06F 11/00* (2006.01)

(52) U.S. Cl.
USPC .......................................................... 714/748

(58) Field of Classification Search
USPC .......................................................... 714/748
See application file for complete search history.

(56) References Cited

U.S. PATENT DOCUMENTS

| 7,200,181 | B2 | 4/2007 | Kim et al. |
| 7,912,133 | B2 * | 3/2011 | Cheon et al. ............. 375/240.27 |
| 8,223,808 | B2 * | 7/2012 | Muharemovic et al. ...... 370/535 |
| 8,340,043 | B2 * | 12/2012 | Suzuki et al. ................. 370/329 |
| 2009/0296644 | A1 | 12/2009 | Cheon et al. |
| 2010/0220711 | A1 * | 9/2010 | Ishii .............................. 370/350 |

FOREIGN PATENT DOCUMENTS

| EP | 2164201 A2 | 3/2010 |
| KR | 10-0925444 | 10/2009 |

* cited by examiner

*Primary Examiner* — Bryce Bonzo
*Assistant Examiner* — Elmira Mehrmanesh
(74) *Attorney, Agent, or Firm* — Nelson Mullins Riley & Scarborough LLP; Anthony A. Laurentano; Dipti Ramnarain (57) ABSTRACT

Provided are a Physical Uplink Shared CHannel (PUSCH) encoder and an encoding method of the same. The PUSCH encoder includes a plurality of encoding units and a channel interleaving unit interleaving the data transferred from the plurality of encoding units. Herein, the respective encoding units perform encoding operations on different data. The PUSCH encoder is configured to perform the respective encoding operations in parallel. In accordance with the PUSCH encoder and the encoding method thereof, the encoding operations are performed on different data in parallel to reduce latency, leading to an increase in processing speed of a codec system. Furthermore, the increase in processing speed of the codec system results in the improvement of performance and throughput per unit hour in a data communication system.

16 Claims, 7 Drawing Sheets

PHYSICAL UPLINK SHARED CHANNEL ENCODER FOR USER EQUIPMENT MODEM AND ENCODING METHOD OF THE SAME

CROSS-REFERENCE TO RELATED APPLICATIONS

This U.S. non-provisional patent application claims priority under 35 U.S.C. §119 of Korean Patent Application No. 10-2010-0073378, filed on Jul. 29, 2010, the entire contents of which are hereby incorporated by reference.

BACKGROUND OF THE INVENTION

The present invention disclosed herein relates to an encoder, and more particularly, to a Physical Uplink Shared CHannel (PUSCH) encoder and an encoding method of the same.

3rd generation partnership project (3GPP) long term evolution (LTE) is a transmission standard for wireless high-speed mobile communication. 3GPP LTE channels may be classified into uplink physical channels, downlink physical channels, uplink transport channels, downlink transport channels, and the like.

Uplink physical channels include physical uplink shared channels (PUSCH), physical uplink control channels (PUCCH), physical random access channels (PRACH), and the like.

Downlink physical channels include physical downlink shared channels (PDSCH), physical broadcast channels (PBCH), physical multicast channels (PMCH), physical control format indicator channels (PCFICH), physical downlink control channels (PDCCH), and physical hybrid ARQ (automatic repeat request) indicator channels.

Uplink transport channels include uplink shared channels (UL-SCH), random access channels (RACH), and the like, and downlink transport channels include broadcast channels (BCH), downlink shared channel (DL-SCH), paging channels (PCH), multicast channels (MCH), and the like.

SUMMARY OF THE INVENTION

The present invention provides a physical uplink shared channel encoder for reducing latency, and an encoding method of the same.

Embodiments of the inventive concept provide physical uplink shared channel (PUSCH) encoders, including: a channel quality information (CQI) encoding unit configured to encode CQI data; an uplink shared channel (UL-SCH) encoding unit configured to encode UL-SCH data; a rank indication (RI) encoding unit configured to encode RI data; an acknowledgement (ACK) encoding unit configured to encode ACK data; and a channel interleaving unit interleaving the data transferred from the plurality of encoding units. The PUSCH encoder is configured to perform the encoding operations of the CQI, UL-SCH, RI and ACK encoding units in parallel.

In some embodiments, the channel interleaving unit may include a buffer. When the channel interleaving unit performs the interleaving operation, the channel interleaving unit may store data transferred from the UL-SCH encoding unit in the buffer after storing data transferred from the CQI encoding unit and the RI encoding unit in the buffer. The channel interleaving unit may store data transferred from the ACK encoding unit in the buffer after storing data transferred from the UL-SCH encoding unit in the buffer.

In other embodiments, the data transferred from the UL-SCH encoding unit may be stored in a storage area differing from storage areas of the data transferred from the CQI encoding unit and the RI encoding unit.

In still other embodiments, the data transferred from the ACK encoding unit may be overwritten in the storage areas of the data transferred from the UL-SCH encoding unit and the CQI encoding unit.

In yet other embodiments, each of the CQI encoding unit, the UL-SCH encoding unit, the RI encoding unit, and the ACK encoding unit may include a buffer.

In even other embodiments, each of the buffers may include at least one dual-port RAM (DPRAM).

In further embodiments, a handshake protocol may be used between the CQI encoding unit, the UL-SCH encoding unit, the RI encoding unit and the ACK encoding unit, and the channel interleaving unit.

In still further embodiments, the channel interleaving unit may perform an interleaving operation in 6-bit symbol units, and the formation of the symbol may vary with a modulation type.

In yet further embodiments, when the modulation type is quadrature phase-shift keying (QPSK), first and second bits may be set to valid bits. When the modulation type is 16-quadrature amplitude modulation (16-QAM), first to fourth bits may be set to valid bits. When the modulation type is 64-quadrature amplitude modulation (64-QAM), all of bits of the symbol may be set to valid bits.

In some embodiments, there are provided PUSCH encoders including: a CQI encoding unit configured to encode CQI data; an UL-SCH encoding unit configured to encode UL-SCH data; an RI encoding unit configured to encode RI data; an ACK encoding unit configured to encode ACK data; and an interleaving buffer. The PUSCH encoders include a channel interleaving unit performing an interleaving operation by storing data transferred from the CQI encoding unit, the UL-SCH encoding unit, the RI encoding unit and the ACK encoding unit, in the interleaving buffer. The PUSCH encoder is configured to perform encoding operations of the CQI encoding unit, the UL-SCH encoding unit, the RI encoding unit, and the ACK encoding unit performed in parallel.

In other embodiments, the interleaving buffer may include a plurality of dual-port RAMs. The plurality of dual-port RAMs may be classified into a first storage area where the data transferred from the CQI encoding unit is stored, a second storage area where the data transferred from the RI encoding unit is stored, and a third storage area where the data transferred from the UL-SCH encoding unit is stored. The data transferred from the ACK encoding unit may be overwritten in the first and third storage areas.

In yet other embodiments, the first to third storage areas may include symbol cells. The data transferred from the CQI encoding unit may be stored in the first storage area in ascending order from the lowest value of addresses of the symbol cells. The data transferred from the RI encoding unit may be stored in the second storage area in descending order from the highest value of addresses of the symbol cells.

In still other embodiments, the data transferred from the UL-SCH encoding unit may be stored in the third storage area in ascending order from the lowest value of addresses of the symbol cells, after the data transferred from the CQI encoding unit and the RI encoding unit are stored.

In even other embodiments, the data transferred from the ACK encoding unit may be overwritten in the first and third storage areas in descending order from the highest value of addresses of the symbol cells.

In further embodiments, the channel interleaving unit may output an interleaving result data which is stored in the plurality of dual-port RAMs after performing the interleaving operation in ascending order from the lowest value of addresses of the symbol cells.

In some embodiments, there are provided encoding methods of a physical uplink shared channel encoder including: performing encoding operations on CQI data, UL-SCH data, RI data and ACK data in parallel; storing the encoded CQI data and RI data in an interleaving buffer in symbol units; storing the encoded UL-SCH data in the interleaving buffer in symbol units; storing the encoded ACK data in the interleaving buffer in symbol units; and outputting the data stored in the interleaving buffer.

In other embodiments, in the storing of the encoded UL-SCH data in the interleaving buffer in symbol units, the encoded UL-SCH data may be stored in a storage area differing from storage areas of the encoded CQI data and the encoded RI data in the interleaving.

In further embodiments, in the storing of the encoded ACK data in the interleaving buffer in symbol units, the encoded ACK data may be overwritten in storage areas of the encoded CQI data and the encoded UL-SCH.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

A physical uplink shared channel (hereinafter, referred to as PUSCH) encoder according to an embodiment of the present invention reduces latency by performing encoding operations on channel quality information (CQI) data, uplink shared channel (UL-SCH) data, rank indication (RI) data, and acknowledgement (ACK) data in parallel.

Hereinafter, preferred embodiments of the present invention will be described with reference to the accompanying drawings to fully explain the present invention in such a manner that it may easily be carried out by a person with ordinary skill in the art to which the present invention pertains.

Figure 1:
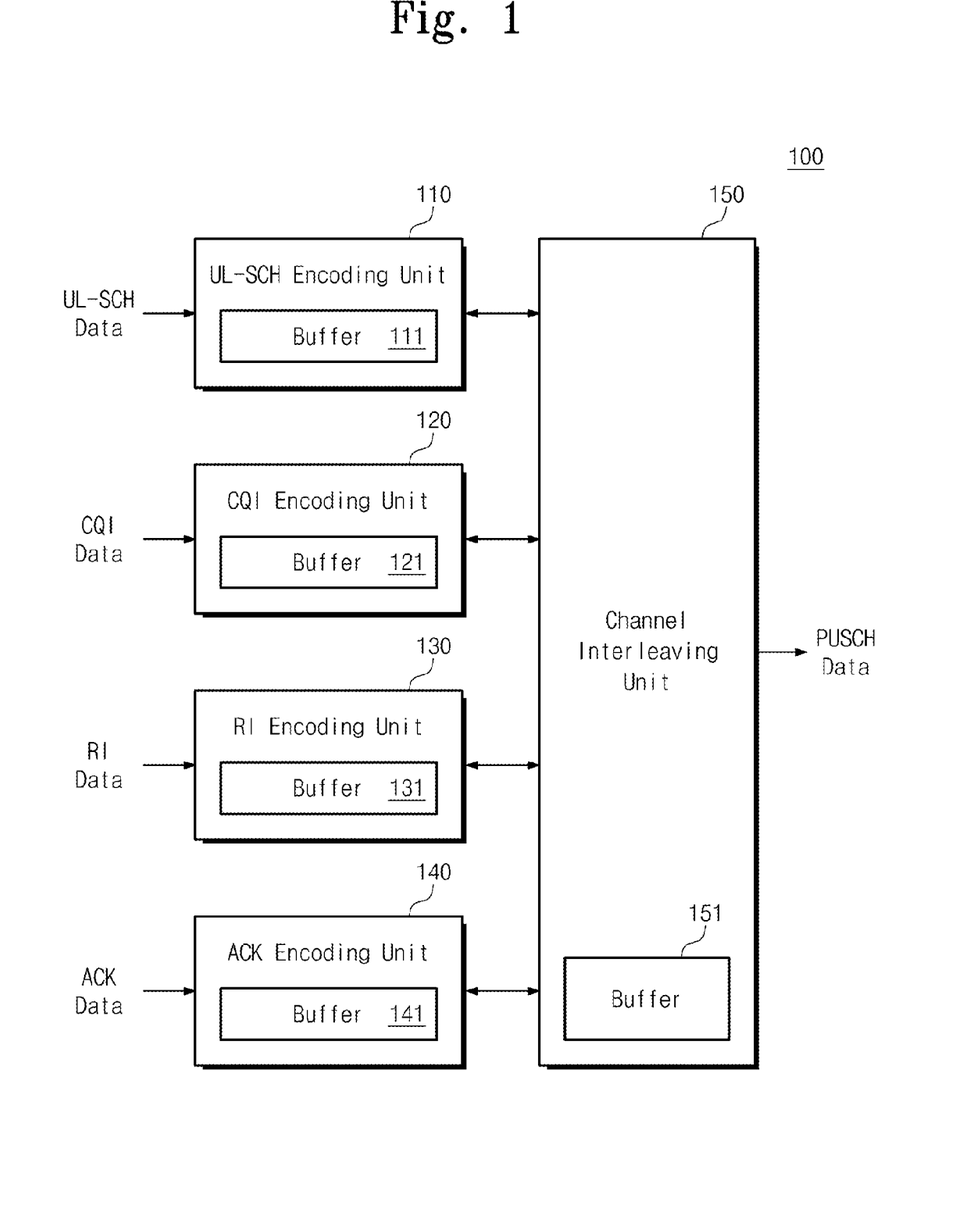
FIG. 1 is a block diagram illustrating a physical uplink shared channel (PUSCH) encoder according to an embodiment of the present invention.

FIG. 1 is a block diagram illustrating a PUSCH encoder according to an embodiment of the present invention. Referring to FIG. 1, a PUSCH encoder 100 includes a UL-SCH encoding unit 110, a CQI encoding unit 120, an RI encoding unit 130, an ACK encoding unit 140, and a channel interleaving unit 150.

The UL-SCH encoding unit 110 includes a buffer 111. The UL-SCH encoding unit 110 encodes UL-SCH data input. Here, the encoded UL-SCH data are stored in the buffer 111. The UL-SCH encoding unit 110 transfers the encoded UL-SCH data to the channel interleaving unit 150.

The CQI encoding unit 120 includes a buffer 121. The CQI encoding unit 120 encodes CQI data input. Here, the encoded CQI data are stored in the buffer 121. The CQI encoding unit 120 transfers the encoded CQI data to the channel interleaving unit 150.

The RI encoding unit 130 includes a buffer 131. The RI encoding unit 130 encodes RI data input. Here, the encoded RI data are stored in the buffer 131. The RI encoding unit 130 transfers the encoded RI data to the channel interleaving unit 150.

The ACK encoding unit 140 includes a buffer 141. The ACK encoding unit 140 encodes ACK data input. Here, the encoded ACK data are stored in the buffer 141. The ACK encoding unit 140 transfers the encoded ACK data to the channel interleaving unit 150.

The channel interleaving unit 150 includes a buffer 151. The channel interleaving unit 150 interleaves the data transferred from the UL-SCH encoding unit 110, the CQI encoding unit 120, the RI encoding unit 130, and the ACK encoding unit 140, respectively. In other words, the UL-SCH, CQI, RI and ACK data encoded in the respective encoding units 110 to 140 are interleaved. Here, the interleaving result data are stored in the buffer 151. The channel interleaving unit 150 outputs the interleaving result data as PUSCH data.

The channel interleaving unit 150 performs a channel interleaving operation after generating n-bit symbols from the encoded data transferred from the respective encoding unit 110 to 140. That is, the channel interleaving unit 150 performs the interleaving operation in symbol unit.

As an embodiment of the present invention, 6-bit symbol is used. In other words, the symbol includes a first to sixth bit. The formation of the symbol depends on modulation type. For example, if the modulation type is quadrature phase-shift keying (QPSK), first and second bits are set to valid bits but third to sixth bit are set to zero. If the modulation type is 16-quadrature amplitude modulation (16-QAM), first to fourth bits are set to valid bits but fifth and sixth bits are set to zero. If the modulation type is 64-quadrature amplitude modulation (64-QAM), all of first to sixth bits of the symbol are set to valid bits.

There are no data dependency among UL-SCH data, CQI-data, RI data and ACK data mutually. Therefore, the UL-SCH encoding unit 110, the CQI encoding unit 120, the RI encoding unit 130, and the ACK encoding unit 140 may perform the encoding operations independently. This means that the PUSCH encoder 100 may perform the encoding of the UL-SCH data, CQI data, RI data and ACK data in parallel.

As an embodiment of the present invention, to increase the efficiencies of the encoding operation and the interleaving operation, the buffers 111, 121, 131, 141, and 151 which are included in the UL-SCH encoding unit 110, the CQI encoding unit 120, the RI encoding unit 130, the ACK encoding unit 140 and the channel interleaving unit 150, respectively, may be realized by dual-port RAMs (DPRAM).

Also, as an embodiment of the present invention, a handshaking operation according to a handshake protocol is performed to transfer the data encoded in the respective encoding units 110 to 140 to the channel interleaving unit 150. First, the channel interleaving unit 150 transfers a data request signal to the respective encoding units 110 to 140. When the respective encoding units 110 to 140 receive the data request signal, the respective encoding units 110 to 140 transfer the encoded data to the channel interleaving unit 150 together with a response signal. Thereafter, when all encoded data are transferred to the channel interleaving unit 150 from the respective encoding units 110 to 140, the handshaking operation is finished. The handshaking operating will be more fully described with reference to FIGS. 2 and 3 below.

As an embodiment of the present invention, the respective encoding units 110 to 140 may be enabled or disabled selectively. Here, the handshaking operation with the disabled encoding unit is excluded, because the disabled encoding unit does not encode any data.

Figure 2:
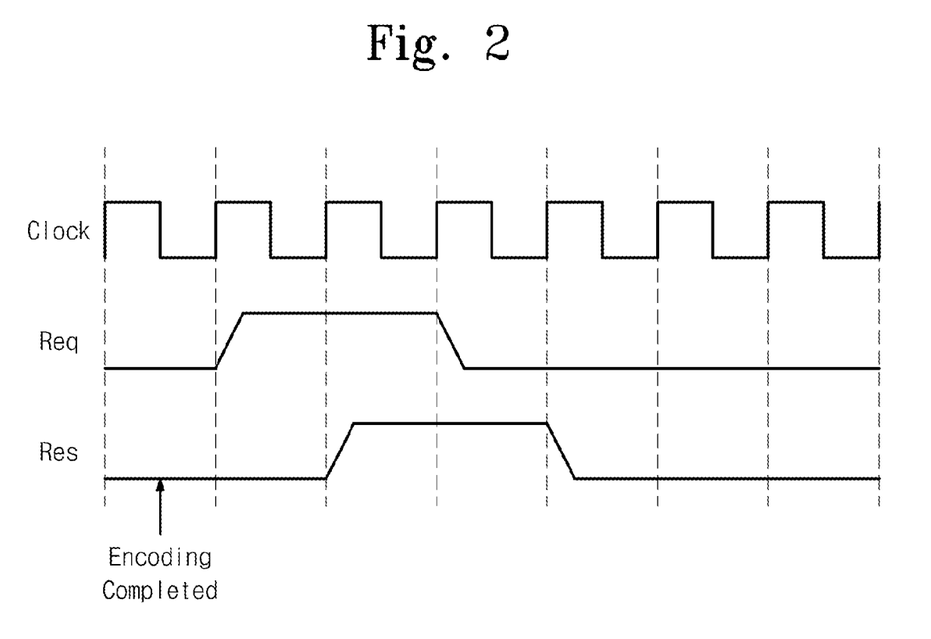
FIGS. 2 and 3 are timing diagrams illustrating a handshaking operation between an encoding unit and a channel interleaving unit.
Figure 3:
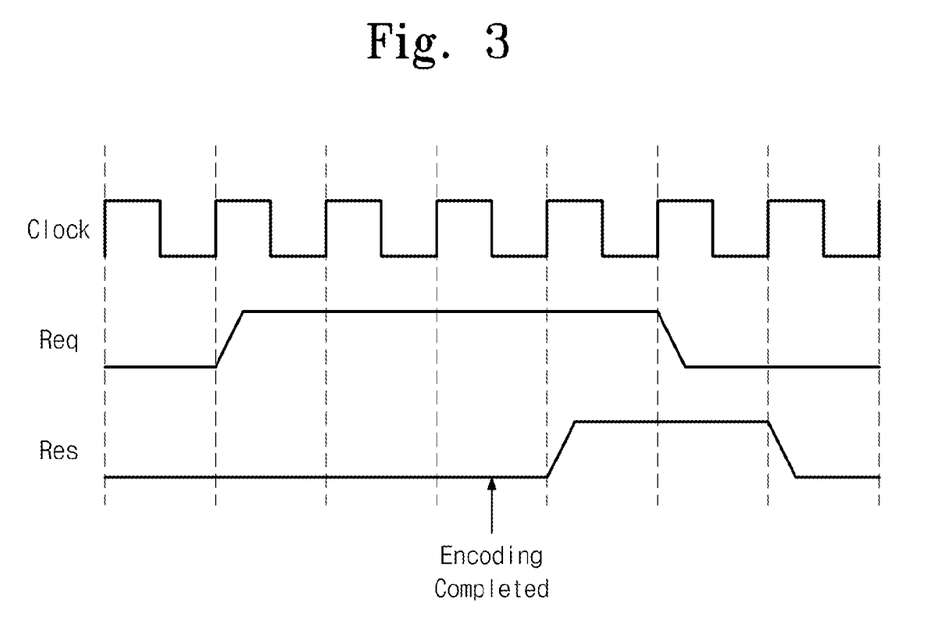

FIGS. 2 and 3 are timing diagrams illustrating the handshaking operation between the encoding unit and the channel interleaving unit. FIG. 2 illustrates that the encoding unit receives the data request signal from the channel interleaving unit after the encoding operation is completed. FIG. 3 illustrates that the encoding unit receives the data request signal from the channel interleaving unit before the encoding operation is completed.

Referring to FIG. 2, in order to request data, the channel interleaving unit activates a data request signal Req and transfers the activated data request signal Req to the encoding unit. Since the encoding unit has completed the encoding operation before receiving the activated data request signal Req, a response signal Res is activated in response to the activated data request signal Req. Hereinafter, the encoding unit transfers the encoded data to the channel interleaving unit together with the activated response signal Res. The channel interleaving unit deactivates the data request signal Req in response to the activated response signal Res.

The encoding unit activates the response signal Res while the encoded data is transferred to the encoding unit. Afterwards, when all the encoded data are transferred, the encoding unit deactivates the response signal Res. Thus, the handshaking operation is finished.

Referring to FIG. 3, to request data, the channel interleaving unit activates a data request signal Req and transfers the activated data request signal Req to the encoding unit. After receiving the activated data request signal Req, the encoding unit maintains the response signal Res to have the deactivated state until the encoding operation is completed. Thereafter, when the encoding operation is completed, the encoding unit activates the response signal Res in response to the activated request signal Req. The encoding unit transfers the encoded data to the channel interleaving unit together with the activated response signal Res. The channel interleaving unit deactivates the data request signal Req in response to the activated response signal Res.

The encoding unit activates the response signal Res while the encoded data is transferred to the channel interleaving unit from the encoding unit. When all encoded data are transferred, the encoding unit deactivates the response signal Res. Thus, the handshaking operation is finished.

Referring to FIG. 1 again, the channel interleaving unit 150 performs the above-described handshaking operation with the UL-SCH encoding unit 110, the CQI encoding unit 120, the RI encoding unit 130 and the ACK encoding unit 140, respectively. However, the handshaking operation between the channel interleaving unit 150 and the respective encoding units 110 to 140 is performed according to an interleaving order. For example, suppose that the encoded CQI data is data to be interleaved first, the channel interleaving unit 150 performs the handshaking operation with the CQI encoding unit 120 first of all.

Figure 4:
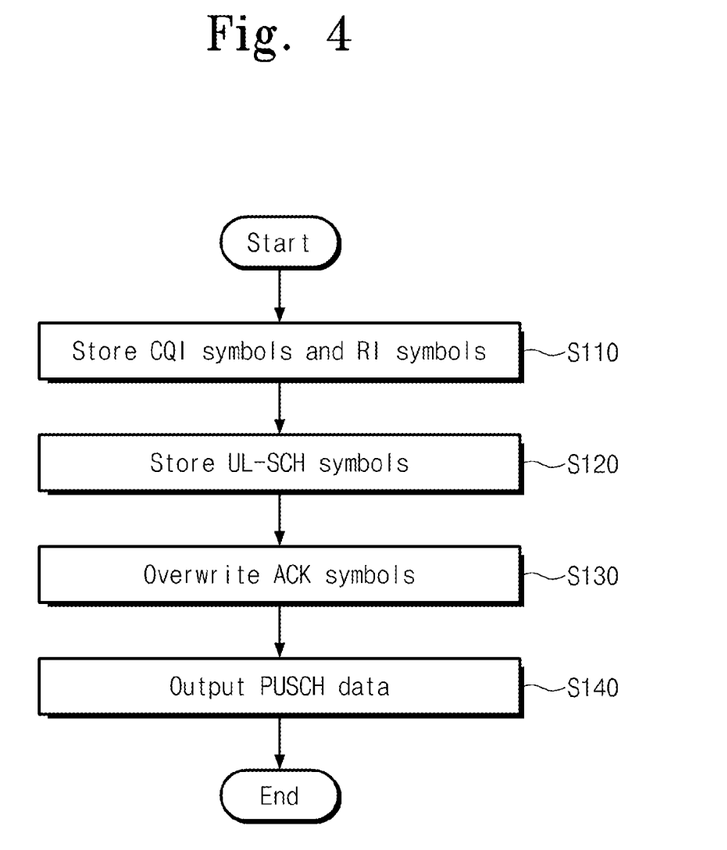
FIG. 4 is a flowchart illustrating an operation of the channel interleaving unit according to an embodiment of the present invention.

FIG. 4 is a flowchart illustrating an operation of the channel interleaving unit according to an embodiment of the present invention. As stated above, the channel interleaving unit 150 (refer to FIG. 1) performs the interleaving operation, after generating symbols from the encoded data transferred according to the handshaking operation with the respective encoding units 110 to 140 (refer to FIG. 1).

Referring to FIG. 4, first, the channel interleaving unit 150 generates CQI symbols and RI symbols respectively from the encoded CQI data and RI data transferred according to the handshaking operation with the CQI encoding unit 120 and the RI encoding unit 130. In operation S110, the channel interleaving unit 150 stores the CQI symbols and RI symbols in the buffer 151 (refer to FIG. 1).

The channel interleaving unit 150 generates UL-SCH symbols from the encoded UL-SCH data transferred according to the handshaking operation with the UL-SCH encoding unit 110. In operation S120, the channel interleaving unit 150 stores the UL-SCH symbols in the buffer 151. At this time, the UL-SCH symbols are stored in a storage area differing from storage areas of the CQI symbols and the RI symbols.

Thereafter, the channel interleaving unit 150 generates ACK symbols from the encoded ACK data transferred according to the handshaking operation with the ACK encoding unit 140. In operation S130, the channel interleaving unit 150 stores the ACK symbols in the buffer 151. At this time, the ACK symbols are overwritten in the storage area of the UL-SCH symbols and the CQI symbols.

The above-described interleaving operation has been performed, and then, in operation S140, the channel interleaving unit 150 outputs the interleaving result data stored in the buffer 151 data as PUSCH.

As described above, the respective encoding units 110 to 140 may be enabled or disabled selectively. Here, the disabled encoding unit does not encode any data, and thus the handshaking operation with the disabled encoding unit is excluded.

For example, suppose that the CQI encoding unit 120 is disabled, the handshaking operation with the CQI encoding unit 120 is excluded, and the CQI symbols may be excluded from an interleaving target. That is, after the interleaving operation is completed, the CQI symbols may not be stored in the buffer 151.

Figure 5:
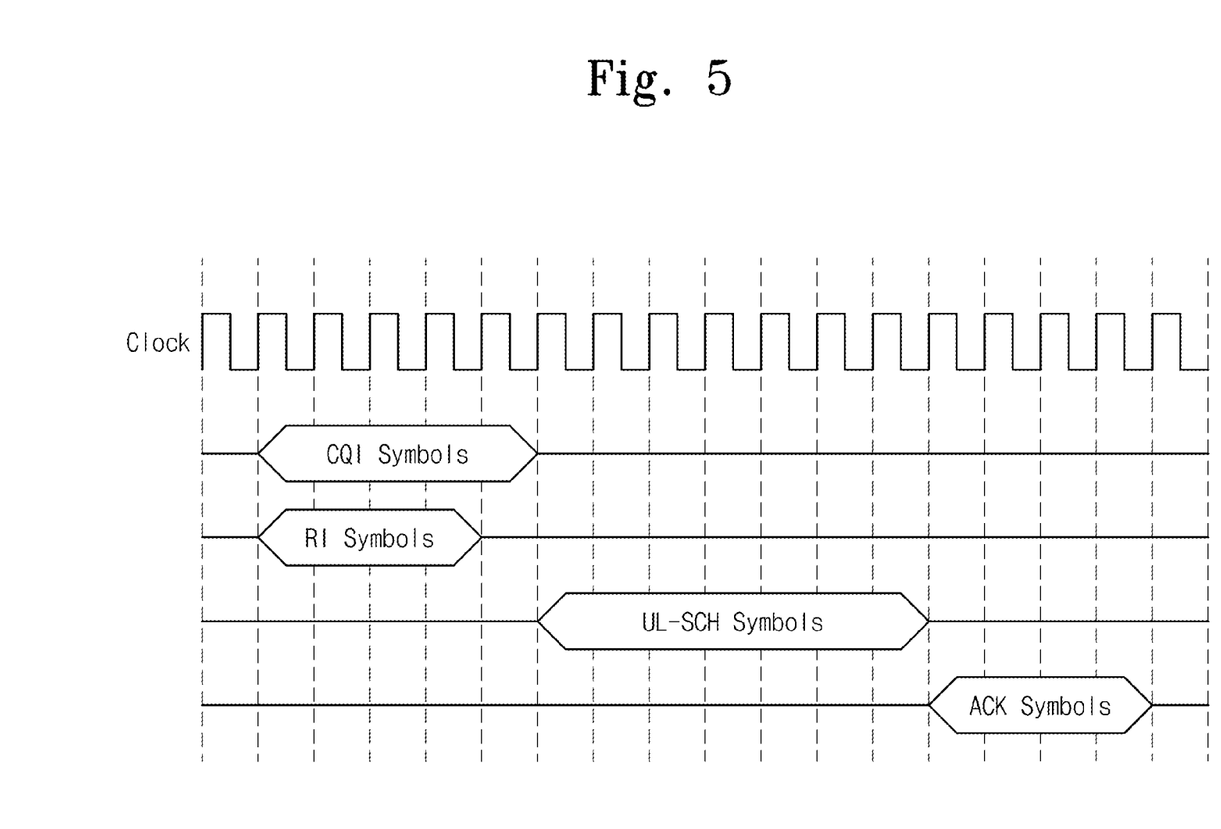
FIG. 5 is a timing diagram illustrating an operation of the channel interleaving unit according to an embodiment of the present invention.

FIG. 5 is a timing diagram illustrating an operation of the channel interleaving unit according to an embodiment of the present invention. Referring to FIG. 5, the channel interleaving unit 150 (refer to FIG. 1) stores the CQI symbols and the RI symbols in the buffer 151 (refer to FIG. 1) first. Thereafter, when the storing of CQI symbols and RI symbols is completed, the channel interleaving unit 150 stores the UL-SCH symbols in the buffer 151. When the storing of the UL-SCH symbols is completed, the channel interleaving unit 150 stores the ACK symbols in the buffer 151. And finally, when the storing of the ACK symbols is completed, the channel interleaving unit 150 outputs the interleaving result data stored in buffer 151 as the PUSCH data.

Figure 6:
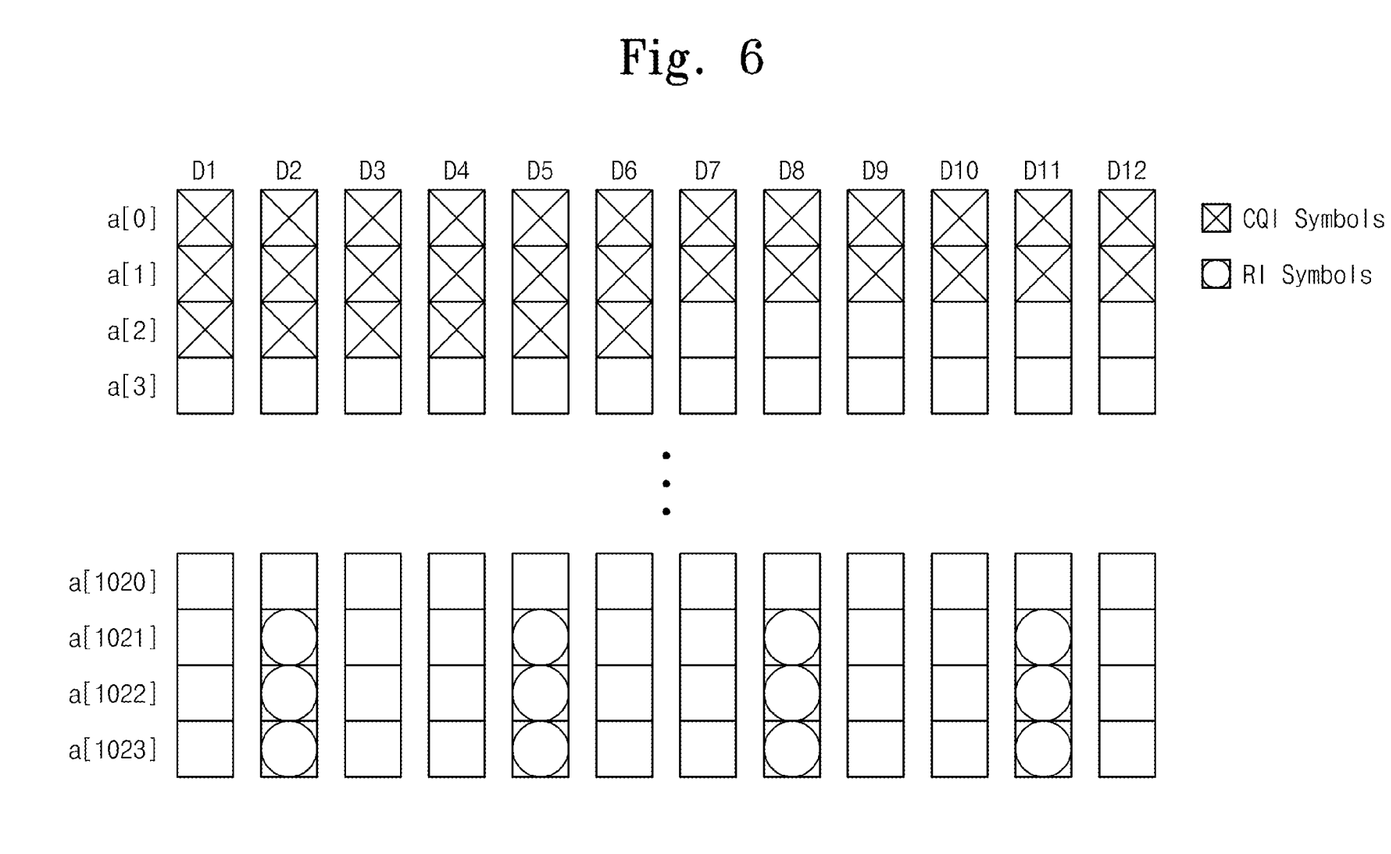
FIGS. 6 to 8 are diagrams illustrating a buffer included in the channel interleaving unit according to an embodiment of the present invention.
Figure 7:
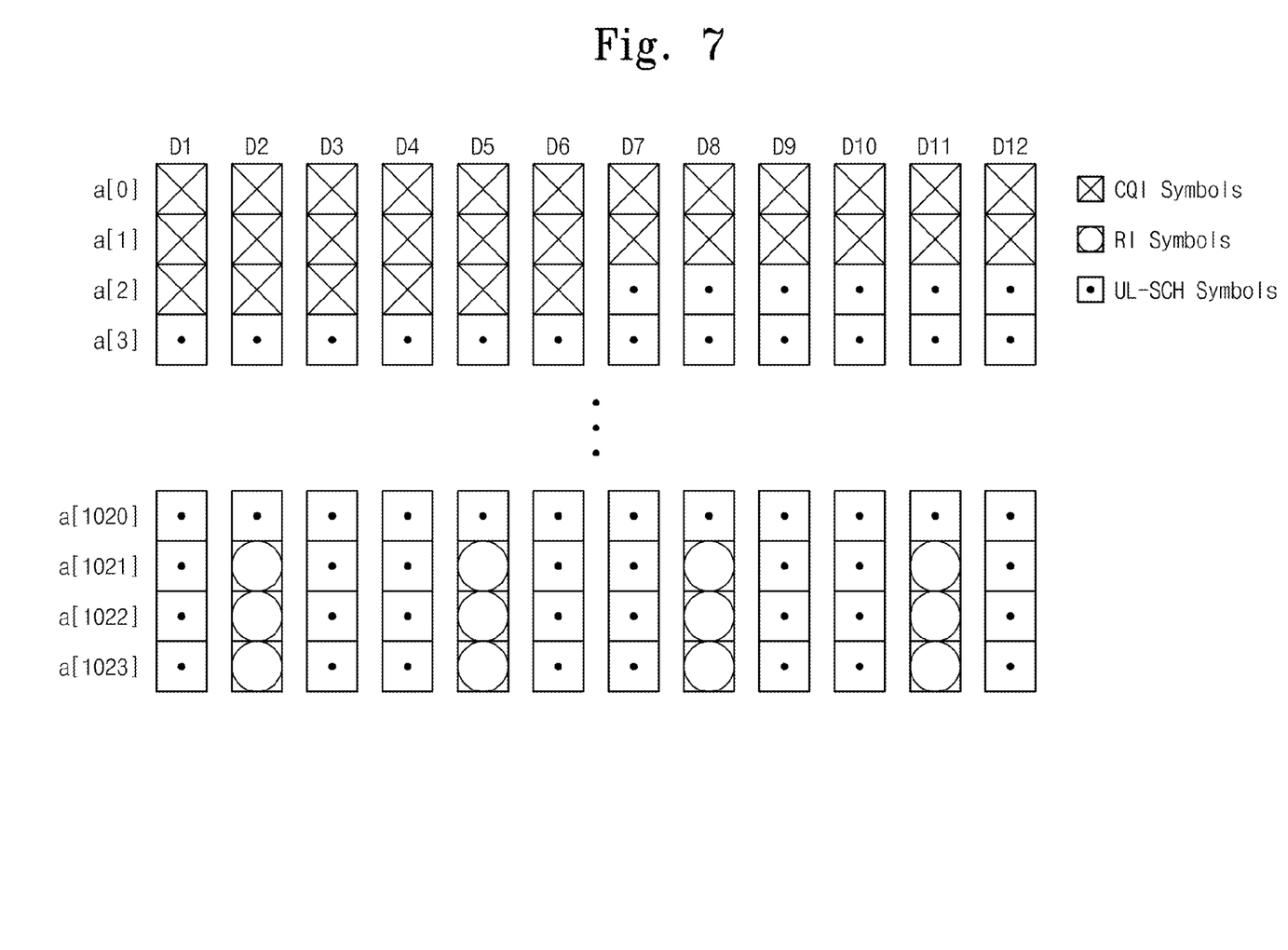
Figure 8:
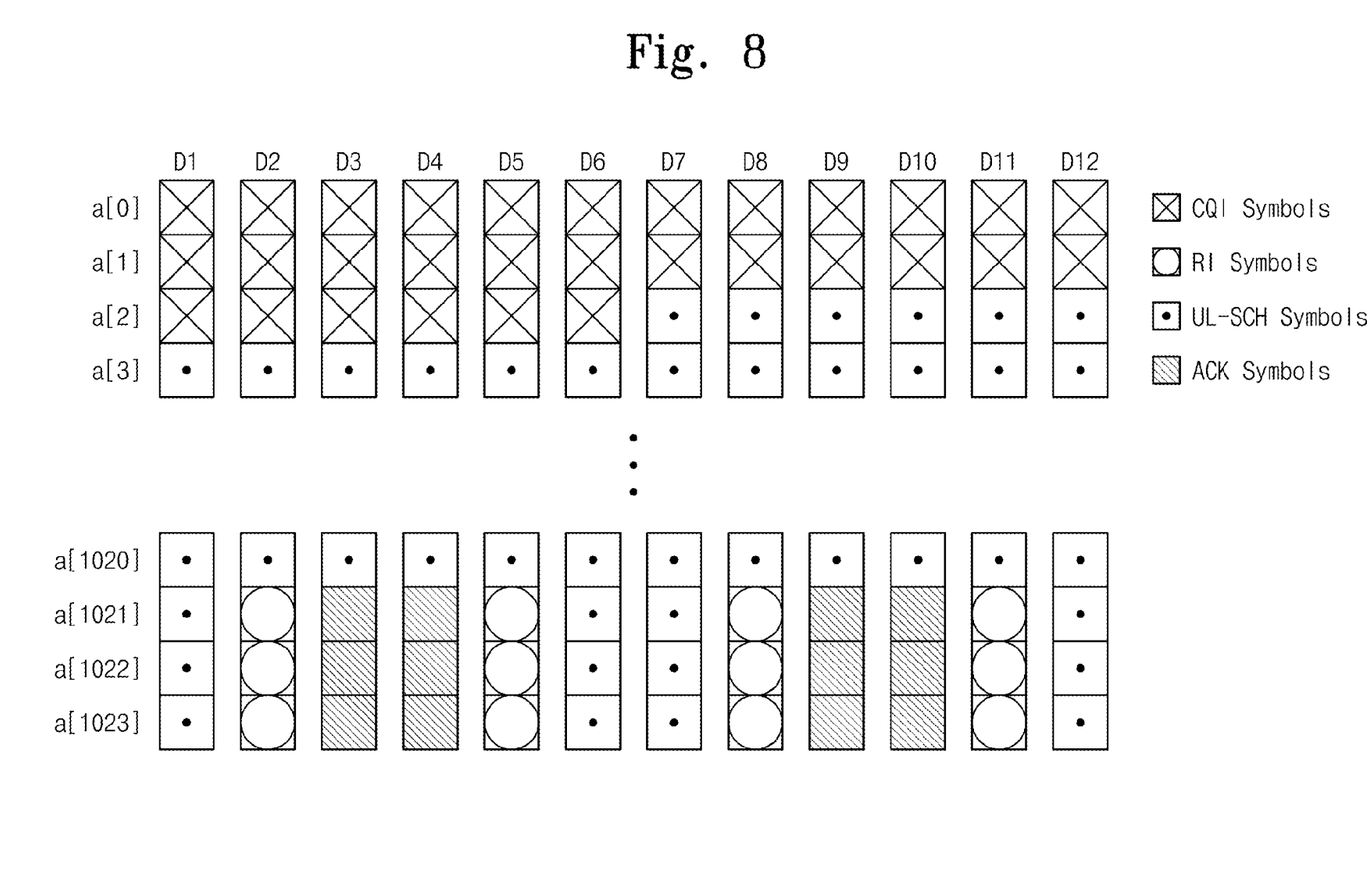

FIGS. 6 to 8 are diagrams illustrating the buffer included in the channel interleaving unit according to an embodiment of the present invention. For simple description, it is assumed that the buffer 151 (refer to FIG. 1, hereinafter, referred to as an interleaving buffer) of the channel interleaving unit 150 (refer to FIG. 1) includes a plurality of DPRAMs.

Referring to FIGS. 6 to 8, the interleaving buffer includes first to twelfth DPRAMs D1 to D12. However, the number of DPRAMs used for interleaving operation varies with the existence of a sounding reference signal (hereinafter, referred to as a sounding RS). For example, in the case where the PUSCH encoder 100 (refer to FIG. 1) processes the sounding RS, the first to eleventh DPRAMs D1 to D11 are used for interleaving. On the other hand, in the case where the PUSCH encoder 100 (refer to FIG. 1) does not process the sounding RS, the first to twelfth DPRAMs D1 to D12 are used for interleaving. For simple description, it is assumed that the first to twelfth DPRAMs D1 to D12 are used for interleaving.

Each of the DPRAMs D1 to D12 includes a plurality of symbol cells. Here, an n-bit address is used for assigning the respective symbol cells. For simple description, it is assumed that a 10-bit address is used. Therefore, the respective DPRAMs D1 to D12 include symbol cells having $0^{th}$ address a[0] to $1023^{rd}$ address a[1023].

FIG. 6 exemplarily illustrates interleaving results for CQI symbols and RI symbols. As described above, the CQI symbols and RI symbols of interleaving target symbols are interleaved first.

Here, all of the first to twelfth DPRAMs D1 to D12 are used as storage areas for the CQI symbols. The CQI symbols are stored in symbol cells in ascending order from the lowest value of addresses of the symbol cells.

For example, the CQI symbols are stored in the symbol cells of $0^{th}$ address a[0] of the first to twelfth DPRAMs D1 to D12 in order, and thereafter are stored in the symbol cells of $1^{st}$ address a[1] of the first to twelfth DPRAMs D1 to D12 in order. In this manner, the CQI symbols are stored in the symbol cells of the $0^{th}$ address a[0] of the first DPRAM D1 to $2^{nd}$ address a[2] of the sixth DPRAM D6 in order.

Some of the first to twelfth DPRAMs D1 to D12 are used as storage areas for the RI symbols. Exemplarily, it is assumed that the second, fifth, eighth and eleventh DPRAMs D2, D5, D8, and D11 are used as storage areas for the RI symbols. Herein, contrary to the case of the CQI symbols, the RI symbols are stored in symbol cells in descending order from the highest value of addresses of the symbol cells.

For example, the RI symbols are stored in the symbol cells of $1023^{nd}$ address a[1023] of the second, fifth, eighth and eleventh DPRAMs D2, D5, D8, and D11 in order, and thereafter are stored in the symbol cells of $1022^{rd}$ address a[1022] of second, fifth, eighth and eleventh DPRAMs D2, D5, D8, and D11 in order. In this manner, the RI symbols are stored in $1023^{rd}$ address a[1023] of the second DPRAM D2 to $1021^{st}$ address a[1021] of the elevenths DPRAM D11 in order.

FIG. 7 exemplarily illustrates interleaving results for the UL-SCH symbols. As described above, the UL-SCH symbols are interleaved after the CQI and RI symbols are interleaved.

Here, all of the first to twelfth DPRAMs D1 to D12 are used as storage areas for the UL-SCH symbols. However, the UL-SCH symbols are stored in symbol cells in which the CQI and RI symbols are not stored. Like the CQI symbols, the UL-SCH symbols are stored in symbol cells in ascending order from the lowest value of addresses of the symbol cell. For example, the UL-SCH symbols are stored in symbol cells in order where the RI symbols are not stored, among the symbol cells from $2^{nd}$ address a[2] of the seventh DPRAM D7 to $1023^{rd}$ address a[1023] of the twelfth DPRAM D12 in order.

FIG. 8 exemplarily illustrates interleaving results for the ACK symbols. As described above, the ACK symbols are interleaved after the CQI, RI and UL-SCH symbols are interleaved.

Here, some of the first to twelfth DPRAMs D1 to D12 are used as storage areas for the ACK symbols. Exemplarily, it is assumed that the third, fourth, ninth and tenth DPRAMs D3, D4, D9, and D10 are used as storage areas for the ACK symbols. The ACK symbols may be overwritten in the symbol cells where the UL-SCH and CQI symbols are stored. The ACK symbols are overwritten in the symbol cells in descending order from the highest value of addresses of the symbol cell.

For example, the ACK symbols are overwritten in the symbol cells of $1022^{nd}$ address a[1022] of the third, fourth, ninth, and tenth DPRAMs D3, D4, D9, and D10 in order after overwritten in the symbol cells of $1023^{rd}$ address a[1023] of the third, fourth, ninth, and tenth DPRAMs D3, D4, D9, and D10 in order. In this manner, the ACK symbols are stored in the symbol cells of $1023^{rd}$ address a[1023] of the third DPRAM D3 to $1021^{st}$ address a[1021] of the tenth DPRAM D10 in order.

Hereinafter, the channel interleaving unit 150 (refer to FIG. 1) reads the symbols in ascending order from the lowest value of addresses of the symbol cell, and then outputs the result as PUSCH data.

For example, the channel interleaving unit 150 reads symbols stored in the symbol cells of $0^{th}$ address a[0] of the first to twelfth DPRAMs D1 to D12 in order, and thereafter reads symbols stored in the symbol cells of $1^{st}$ address a[1] of the first to twelfth DPRAMs D1 to D12 in order. Likewise, the channel interleaving unit 150 reads symbols stored in the symbol cells of $0^{th}$ address a[0] of the first DPRAM D1 to $1023^{rd}$ address a[1023] of the twelfth DPRAM D12 in order, and then outputs the result as PUSCH data.

As described above, in accordance with the PUSCH encoder and the encoding method thereof according to the embodiments of the present invention, encoding operations are performed on different data in parallel to reduce latency, leading to an increase in processing speed of a codec system. Furthermore, the increase in processing speed of the codec system results in the improvement of performance and throughput per unit hour in a data communication system.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A physical uplink shared channel (PUSCH) encoder, comprising:
   a plurality of encoding units performing encoding operations on different data, wherein the plurality of encoding units comprise:
      a channel quality information (CQI) encoding unit configured to encode CQI data;
      an uplink shared channel (UL-SCH) encoding unit configured to encode UL-SCH data;
      a rank indication (RI) encoding unit configured to encode RI data; and
      an acknowledgement (ACK) encoding unit configured to encode ACK data; and
   a channel interleaving unit interleaving the data transferred from the plurality of encoding units, wherein the channel interleaving unit comprises a buffer, and when the channel interleaving unit performs the interleaving operation, the channel interleaving unit stores:
      data transferred from the UL-SCH encoding unit in the buffer after storing data transferred from the CQI encoding unit and the RI encoding unit in the buffer, and
      data transferred from the ACK encoding unit in the buffer after storing data transferred from the UL-SCH encoding unit in the buffer,
   wherein the encoding operations of the plurality of encoding units are performed in parallel.

2. The PUSCH encoder of claim 1, wherein the data transferred from the UL-SCH encoding unit is stored in a storage area differing from storage areas of the data transferred from the CQI encoding unit and the RI encoding unit.

3. The PUSCH encoder of claim 2, wherein the data transferred from the ACK encoding unit is overwritten in the storage areas of the data transferred from the UL-SCH encoding unit and the CQI encoding unit.

4. The PUSCH encoder of claim 1, wherein each of the CQI encoding unit, the UL-SCH encoding unit, the RI encoding unit, the ACK encoding unit, and the channel interleaving unit comprises at least one dual-port RAM (DPRAM).

5. The PUSCH encoder of claim 1, wherein a handshake protocol is used between the CQI encoding unit, the UL-SCH encoding unit, the RI encoding unit and the ACK encoding unit, and the channel interleaving unit.

6. The PUSCH encoder of claim 1, wherein
the channel interleaving unit performs an interleaving operation in 6-bit symbol units, and
the formation of the symbol varies with a modulation type.

7. The PUSCH encoder of claim 6, wherein:
when the modulation type is quadrature phase-shift keying (QPSK), first and second bits are set to valid bits;
when the modulation type is 16-quadrature amplitude modulation (16-QAM), first to fourth bits are set to valid bits; and
when the modulation type is 64-quadrature amplitude modulation (64-QAM), all of bits of the symbol are set to valid bits.

8. A PUSCH encoder, comprising:
a CQI encoding unit configured to encode CQI data;
an UL-SCH encoding unit configured to encode UL-SCH data;
an RI encoding unit configured to encode RI data;
an ACK encoding unit configured to encode ACK data; and
a channel interleaving unit including an interleaving buffer, and performing an interleaving operation by storing data transferred from the CQI encoding unit, the UL-SCH encoding unit, the RI encoding unit and the ACK encoding unit, in the interleaving buffer, wherein the interleaving buffer comprises a plurality of dual-port RAMs,
wherein encoding operations of the CQI encoding unit, the UL-SCH encoding unit, the RI encoding unit, and the ACK encoding unit are performed in parallel.

9. The PUSCH encoder of claim 8, wherein the plurality of dual-port RAMs are classified into a first storage area where the data transferred from the CQI encoding unit is stored, a second storage area where the data transferred from the RI encoding unit is stored, and a third storage area where the data transferred from the UL-SCH encoding unit is stored, and
the data transferred from the ACK encoding unit is overwritten in the first and third storage areas.

10. The PUSCH encoder of claim 9, wherein the first to third storage areas comprise symbol cells,
the data transferred from the CQI encoding unit being stored in the first storage area in ascending order from the lowest value of addresses of the symbol cells, and
the data transferred from the RI encoding unit being stored in the second storage area in descending order from the highest value of addresses of the symbol cells.

11. The PUSCH encoder of claim 10, wherein the data transferred from the UL-SCH encoding unit is stored in the third storage area in ascending order from the lowest value of addresses of the symbol cells, after the data transferred from the CQI encoding unit and the RI encoding unit are stored.

12. The PUSCH encoder of claim 11, wherein the data transferred from the ACK encoding unit is overwritten in the first and third storage areas in descending order from the highest value of addresses of the symbol cells.

13. The PUSCH encoder of claim 12, wherein the channel interleaving unit outputs an interleaving result data which is stored in the plurality of dual-port RAMs after performing the interleaving operation in ascending order from the lowest value of addresses of the symbol cells.

14. An encoding method of a PUSCH encoder, the method comprising:
performing encoding operations on different data in parallel, wherein the different data comprise a CQI data, an UL-SCH data, a RI data and an ACK data, wherein the encoded ACK data is overwritten in storage areas of the encoded CQI data and the encoded UL-SCH data;
interleaving the encoded data; and
outputting the interleaved data.

15. The encoding method of claim 14, wherein during the interleaving, the encoded CQI data, RI data, UL-SCH data and ACK data are stored in an interleaving buffer in symbol units.

16. The encoding method of claim 15, wherein the encoded UL-SCH data is stored in a storage area differing from storage areas of the encoded CQI data and the encoded RI data in the interleaving.

* * * * *